United States Patent [19]

Morita

[11] Patent Number: 4,782,277

[45] Date of Patent: Nov. 1, 1988

[54] METHOD OF DRIVING AND CONTROLLING A STEPPING MOTOR

[75] Inventor: Naoyuki Morita, Kanagawa, Japan

[73] Assignee: Fuji Photo Film Co., Ltd., Kanagawa, Japan

[21] Appl. No.: 55,279

[22] Filed: May 29, 1987

[30] Foreign Application Priority Data

May 29, 1986 [JP] Japan .................................. 61-124409

[51] Int. Cl.$^4$ ............................................... H02P 8/00
[52] U.S. Cl. ..................................... 318/696; 318/685
[58] Field of Search ................................ 318/696, 685

[56] References Cited

U.S. PATENT DOCUMENTS 3,986,094 10/1976 Quioque et al. ...................... 318/696

Primary Examiner—William M. Shoop, Jr.
Assistant Examiner—Saul M. Bergmann
Attorney, Agent, or Firm—Sughrue, Mion, Zinn, Macpeak & Seas

[57] ABSTRACT

A method of driving and controlling a stepping motor having stationary field poles corresponding to N phases (N: an integer greater than or equal to 4) in which the stationary field poles are successively driven for m steps in such a manner that a number n, ranging form 1 to (N−2), of phases are driven at a time. In this method, after the completion of excitation of an (m−1)th step, stationary field poles are driven with respect to a number of phases larger than n to a desired value set between the stability points of the m−1)th step and the mth step.

5 Claims, 4 Drawing Sheets

METHOD OF DRIVING AND CONTROLLING A STEPPING MOTOR

BACKGROUND OF THE INVENTION

1. Field of the Invention

This invention relates to a method of driving and controlling a stepping motor and, more particularly, to an intermittent-driving method which enables a stepping motor to be driven at a high speed and stopped at any desired position without any oscillation of the motor.

2. Description of the Prior Art

An example of positive casting control or deadbeat control, which has been known as a method of driving and controlling a stepping motor, is disclosed in Japanese Patent Laid-Open No. 36409/1977. This type of casting control enables a stepping motor to be rapidly stopped by utilizing an overshoot of the stepping motor, and it is effected in such a manner that application of pulses is temporarily stopped one step before a desired point to cause the motor to overshoot and the pulse of the remaining step is applied when the motor comes closest to the desired point. This positive casting control sets the shaft of the motor as shown in FIG. 3, so that the motor can be stopped without any oscillation.

However, if, as shown in FIG. 2, an object to be driven is connected to a stepping motor by a spring system 4 consisting of a spring and a damper and is driven by the stepping motor (for example, an exposure head is made to secondarily scan by using reels and synchronizing belts), the above-described method of positive casting control cannot stop the driven object without oscillation, resulting in the state shown in FIG. 4. As shown in FIG. 4 which shows the extent of movement of the driven object when the stepping motor is driven by a timing of 0, 1.2, 2.2, 6.5 ms, the driven object oscillates relative to a desired point in a range of ±3.5% even after 33 ms (1 idling) have passed.

SUMMARY OF THE INVENTION

The present invention has been made to overcome the above-described problems, and an object of the present invention is to provide a method of driving and controlling a stepping motor capable of stopping a driven object without any oscillation, which is moving at a high speed.

To this end, the present invention provides a method of driving and controlling a stepping motor having stationary field poles corresponding to N phases (N: an integer greater than or equal to 4) in which the stationary field poles are successively driven for m steps in such a manner that a number n, ranging from 1 to (N−2), of phases are driven at a time, the method comprising: exciting, after the completion of excitation of the stationary field poles in an (m−1)th step, stationary field poles of a number of phases larger than n to a desired value set between a stability point of the (m−1)th step and a stability point of the mth step.

In accordance with the present invention, when a stepping motor having stationary field poles corresponding to N phases (N: an integer greater than or equal to 4) is successively driven for m steps in such a manner that a number n, ranging from 1 to (N−2), of phases are driven at a time, thereafter stopping the motor in an mth step, the stationary field poles are successively excited n phases at a time to a step ((m−1)th step) one step before the final step. After the completion of excitation in the (m−1)th step, the stationary field poles are excited with respect to a number of phases larger than n to a desired value between the stability points of the (m−1)th step and the mth step. The stepping motor is controlled in this way so as to target a value smaller than that of the stability point of the final step immediately before it is driven to the final step, so that the stepping motor is braked while being damped because of the increased number of phases by which the stationary field poles are excited. Therefore, even a driven object which is connected to the stepping motor through a spring system can be stopped without any oscillation.

DESCRIPTION OF THE PREFERRED EMBODIMENT

An embodiment of the present invention will be described in detail below with reference to the accompanying drawings. In this embodiment, the present invention is applied to the operation of driving and controlling a stepping motor which secondarily scans an exposure head of an exposure apparatus.

Figure 5:
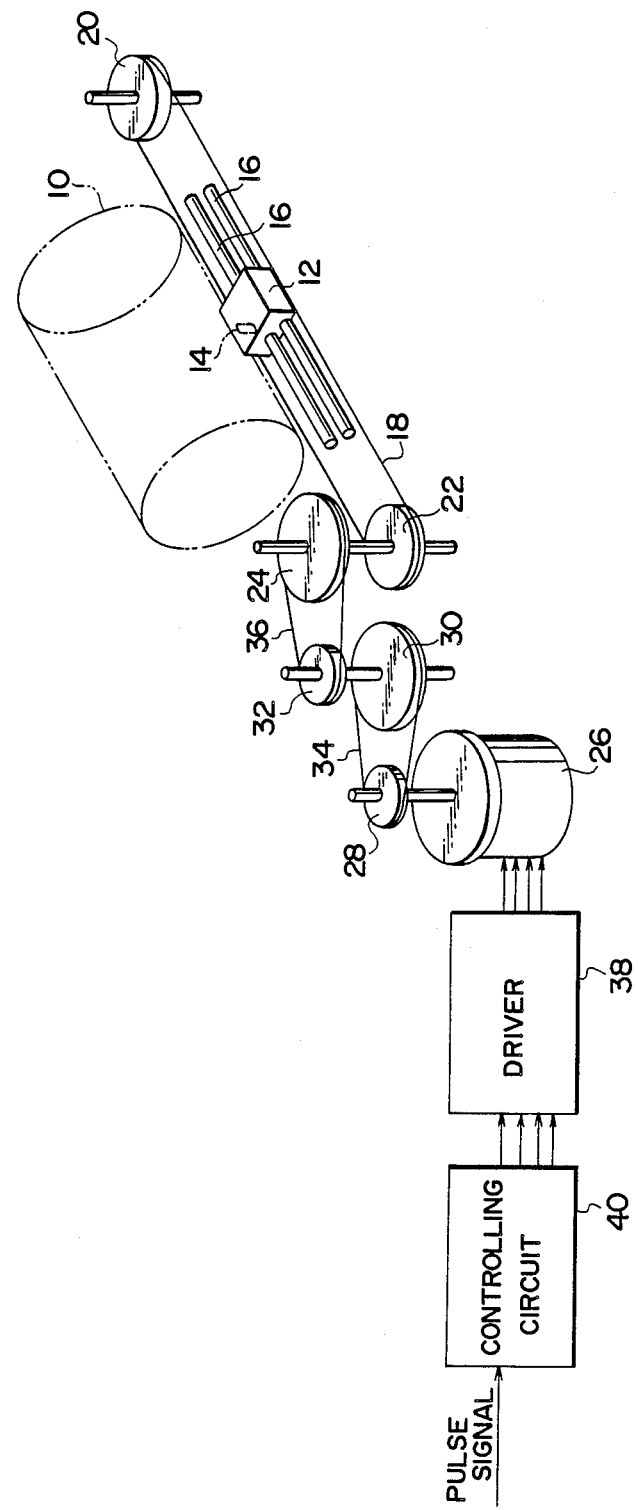
FIG. 5 is a schematic illustration of a driving device for driving an exposure apparatus to which the present invention is applicable.

FIG. 5 is a schematic illustration of an exposure apparatus having a driving device for driving a stepping motor to which the present invention can be applied. An exposure head 12 is disposed in such a manner that a side surface thereof on which a light emitting element 14 is disposed faces the cylindrical surface of a rotary drum 10. The exposure head 12 is slidably mounted on a pair of guide shafts 16 which are disposed parallel to the axis of the rotary drum 10. An idle reel 20 is rotatably supported at one end of the pair of guide shafts 16, and a wire reel 22 is rotatably supported at the other end of the pair of guide shafts 16. A wire 18 is stretched around the idle reel 20 and the wire reel 22 and is fixed to the exposure head on the side nearer the rotary drum 10. A large reel 24 is attached to the shaft of the wire reel 22 so as to be integrally rotatable therewith. A small reel 28 is fixed to an output shaft of a stepping motor 26. A large reel 30 and a small reel 32 which are integrally rotatable are concentrically disposed between the wire reel 22 and the stepping motor 26. A synchronizing belt 34 is stretched around the small reel 28 and the large reel 30, and a synchronizing belt 36 is stretched around the small reel 32 and the large reel 24. Therefore, as the output shaft of the stepping motor 26 and, hence, the small reel 28 are rotated, the wire reel 22 is rotated through the medium of the synchronizing belt 34, the large reel 30, the small reel 32, the synchronizing belt 36 and the large reel 24, and the wire 18 is thereby moved in the longitudinal direction of the shafts 16, so that the exposure head 12 moves along the shafts 16. The reels 22, 24, 30 and 32, the belts 34 and 36 and the wire 18 constitute a spring system. In this arrangement, it is possible to effect reciprocal movement of the exposure head 12 along the guide shafts 16 by changing the direction of rotation of the stepping motor 26, thereby making the exposure head 12 scan secondarily. To effect the secondary scan, the stepping motor 26 is intermittently or continuously driven.

The above-mentioned stepping motor 26 has four-phase stationary field poles, and a driver 38 which is provided as a driving means is connected to each of the stationary field poles. The driver 38 is connected to a control circuit 40 constituted by a microcomputer or the like. The control circuit 40 inputs pulse signals, generates signals for exciting the stationary field poles of the stepping motor 26, and supplies these signals to the driver 38. The driver 38 thereby excites the stationary field poles of the stepping motor 26.

Figure 1:
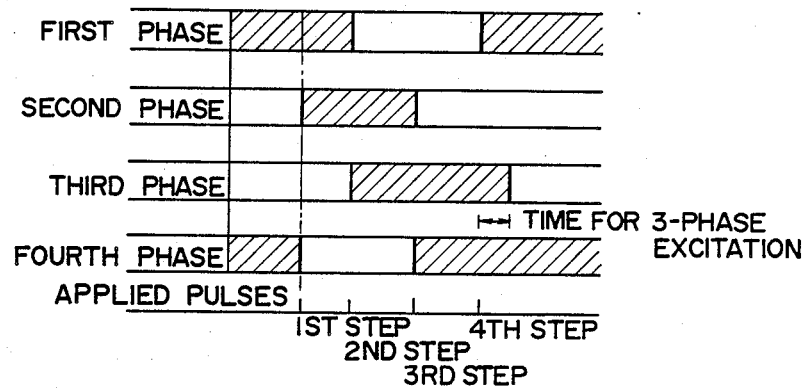
FIG. 1 is a diagram of a sequence of steps of excitation for stationary field poles of a stepping motor in accordance with the present invention.
Figure 2:
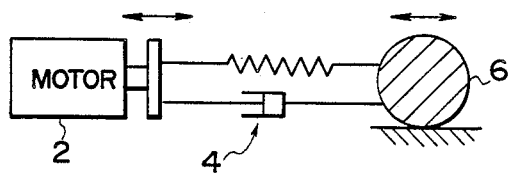
FIG. 2 is a schematic illustration of connection whereby an object is driven by the stepping motor through a spring system.
Figure 3:
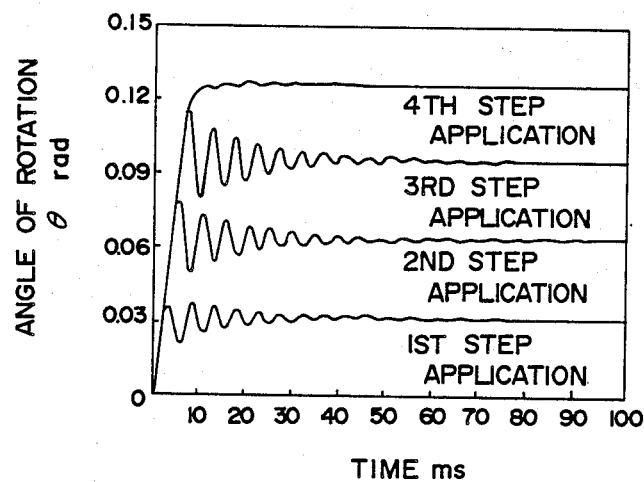
FIG. 3 is a graph of rotational displacements of the output shaft of the stepping motor controlled in a conventional positive casting manner.
Figure 4:
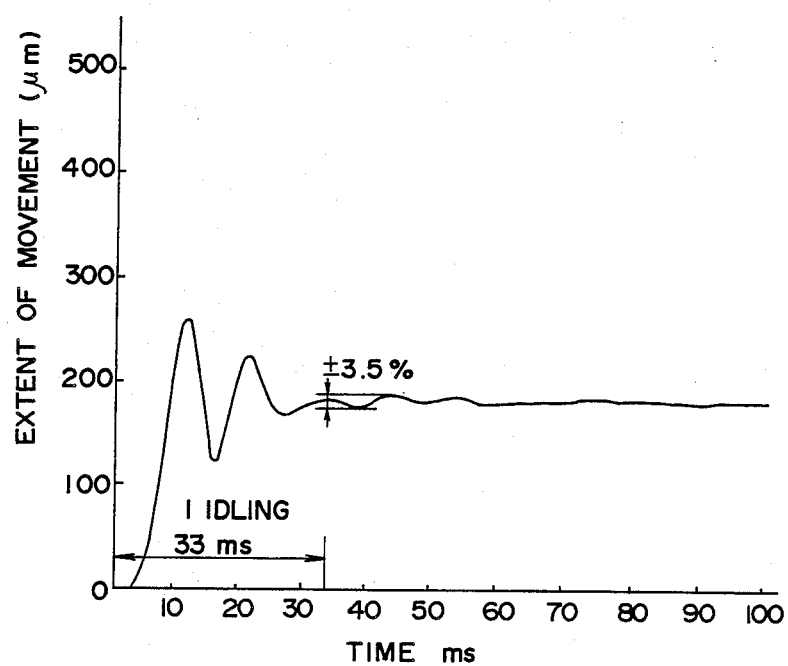
FIG. 4 is a graph of changes in the extent of movement displayed when an object is driven under the conventional positive casting control.

An example of the driving and controlling method in accordance with the present invention will be described below with reference to FIG. 1. In this example, stationary field poles of a four-phase unipolar type of stepping motor are excited two phases at a time. The stationary field poles of the first and fourth phases are first excited to stabilize the rotor of the stepping motor before the stepping motor is driven one step. In a first step, the stationary field poles of the first and second phases are excited; in a second step, the stationary field poles of the second and third phases are excited; and, in a third step, the stationary field poles of the third and fourth phases are excited. The stepping motor is thereby driven through three steps. In an initial stage of the subsequent, fourth step, the excitation of the stationary field pole of the third phase, which has been effected in the third step, is continued while the stationary field poles for the first and fourth phases are being excited, thereby exciting the stationary field poles in the manner of three-phase excitation. After a predetermined time has passed, the stationary field pole of the third phase is degaussed and the excitation with respect to the first and fourth phases is continued. The driving is thereby returned to the usual two-phase excitation.

Figure 6:
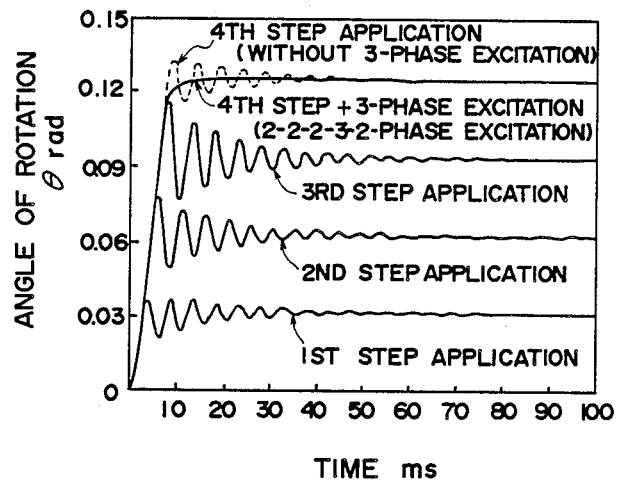
FIG. 6 is a graph of changes in the angle of rotation of the stepping motor controlled in accordance with the present invention.
Figure 7:
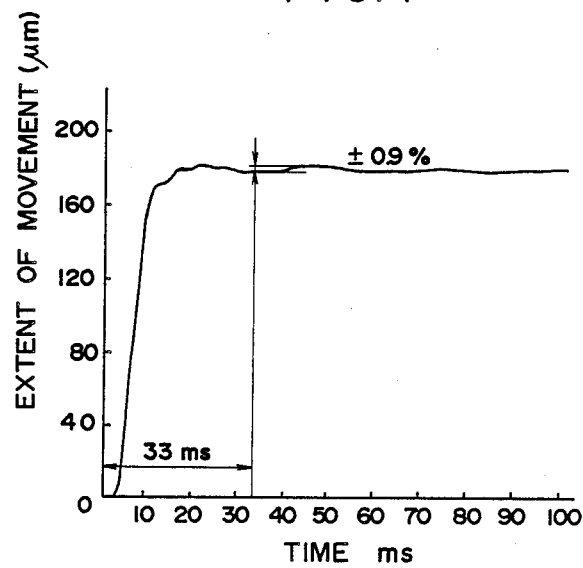
FIG. 7 is a graph of changes in the extent of movement of the exposure head controlled in accordance with the present invention.

The stationary field poles of the stepping motor are excited in this manner, so that the number of stationary field poles which are excited at a time one step before the final step (immediately after the completion of the excitation of the third step) is one more than usual, and the stepping motor is driven to a target point between the stability points of the third and fourth steps. The changes in the angle of rotation of the output shaft of the stepping motor displayed when the stepping motor is driven in this manner are shown in FIG. 6. The broken line in FIG. 6 shows the changes in the angle of rotation of the rotary shaft of the stepping motor in the final step when the stepping motor is driven from the first to fourth steps by exciting the stationary field poles of two phases at a time. FIG. 7 shows the extent of movement of the exposure head when the stepping motor is controlled as described above. After 33 ms have passed, the exposure head oscillates within a range of only ±0.9% about the target stop point, as can be understood from FIG. 7. Thus, the exposure head can be stopped with virtually no oscillation.

The present invention has been described with respect to the example of a four-phase unipolar type of stepping motor in which stationary field poles are excited two phases at a time and for three phases immediately before setting in a final step, but the present invention is not limited to this. The excitation of the stepping motor may be effected when the number of phases of the excitation of the stepping motor ranges from 1 to $N-2$ (where N is the number of phases of stationary field poles and is an integer greater than or equal to 4). In the above example, the number of phases of the excitation is increased by one immediately before setting in the final step. The present invention is not limited to this, and the number by which the phases of the excitation are increased may be determined in accordance with any desired value. It is preferable to previously determine a desired curve along which the stepping motor should be driven and use this desired curve to determine the above-described increased number of phases of the excitation for the stationary field poles and the desired value.

What is claimed is:

1. A method of driving and controlling the shaft of a stepping motor from a starting position to a final position, said stepping motor having stationary field poles corresponding to N phases (N: an integer greater than or equal to 4), said method being of the type in which said stationary field poles are successively driven during m time intervals (m: an integer greater than or equal to 2) in such manner that a number n, ranging from 1 to $(N-2)$, of phases are in an excited state at any time, said method comprising:

after the completion of an $(m-1)$th time interval exciting a number of phases larger than n until said rotor reaches a desired angular position, prior to said final position, and after said rotor has reached said desired angular position, continuing with only n phases in the excited state until said rotor reaches said final position.

2. A method of driving and controlling a stepping motor according to claim 1, wherein an ideal curve for driving said stepping motor is previously determined and wherein said desired value and said number of phases are determined so that said stepping motor is driven along said ideal curve.

3. A method of driving and controlling the shaft of a stepping motor from a starting position to a final position, said stepping motor having stationary field poles corresponding to N phases (N: an integer greater than or equal to 4) and which is used to drive an object to be driven through a spring system, said method being of the type in which said stationary field poles are successively driven during m time intervals (m: an integer greater than or equal to 2) in such a manner that a number n, ranging from 1 to $(N-2)$, of phases are in an excited state at any time, said method comprising steps of:

(a) exciting n phases at a time up through the $(m-1)$th time interval; and (b) after the completion of said $(m-1)$th time interval exciting a number of phases larger than n set until said rotor reaches a desired angular value prior to said final step, and after said rotor has reached said desired angular position, continuing with only n phases in the excited state until said rotor reaches said final position.

4. A method of driving and controlling a stepping motor according to claim 3, further comprising a step (c) of determining an ideal curve along which said stepping motor is driven.

5. A method of driving and controlling a stepping motor according to claim 4, further comprising a step (d) of determining said desired value and said number of phases so that said stepping motor is driven along said ideal curve.

* * * * *